US012771597B2

(12) United States Patent
Mermoud et al.

(10) Patent No.: US 12,771,597 B2
(45) Date of Patent: Oct. 20, 2026

(54) RECOMMENDING CONFIGURATION CHANGES IN SOFTWARE-DEFINED NETWORKS USING MACHINE LEARNING

(71) Applicant: Cisco Technology, Inc., San Jose, CA (US)

(72) Inventors: Grégory Mermoud, Venthône (CH); Stéphane Bernard Martin, Lausanne (CH); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/532,452

(22) Filed: Nov. 22, 2021

(65) Prior Publication Data

US 2023/0164029 A1 May 25, 2023

(51) Int. Cl.

*H04L 41/082* (2022.01)
*H04L 41/08* (2022.01)
*H04L 41/0823* (2022.01)
*H04L 41/16* (2022.01)
*H04L 41/5025* (2022.01)

(52) U.S. Cl.

CPC ........ *H04L 41/082* (2013.01); *H04L 41/0823* (2013.01); *H04L 41/0886* (2013.01); *H04L 41/16* (2013.01); *H04L 41/5025* (2013.01)

(58) Field of Classification Search

CPC ............... H04L 41/082; H04L 41/0823; H04L 41/0886; H04L 41/16; H04L 41/5025; H04L 41/0846

See application file for complete search history.

(56) References Cited

U.S. PATENT DOCUMENTS

| | | | | |
|---|---|---|---|---|
| 7,120,680 | B1 * | 10/2006 | Higgins | H04L 41/12 709/230 |
| 8,190,416 | B2 | 5/2012 | Mead | |
| 9,876,673 | B2 | 1/2018 | Margalit et al. | |
| 10,382,272 | B1 * | 8/2019 | Simaria | H04L 41/0813 |
| 10,862,758 | B2 | 12/2020 | Sethi et al. | |
| 10,951,490 | B2 | 3/2021 | Kumaran et al. | |

(Continued)

OTHER PUBLICATIONS

Samatova, Nagiza, "Frequent Subgraph Mining", online: https://www.csc2.ncsu.edu/faculty/nfsamato/practical-graph-mining-with-R/slides/pdf/Frequent_Subgraph_Mining.pdf, Aug. 7, 2013, accessed Oct. 15, 2021, 75 pages, North Carolina State University, Raleigh, North Carolina.

(Continued)

*Primary Examiner* — Scott B Christensen
*Assistant Examiner* — Zonghua Du
(74) *Attorney, Agent, or Firm* — Lee & Hayes, P.C.

(57) ABSTRACT

In one embodiment, a device associates application performance of an online application with network configuration changes implemented across one or more software-defined networks. The device trains a machine learning model to predict an effect of a configuration change on the application performance for any given portion of the one or more software-defined networks. The device generates a recommended configuration change for a particular portion of the one or more software-defined networks, using the machine learning model. The device causes the recommended configuration change to be implemented in the particular portion of the one or more software-defined networks.

20 Claims, 12 Drawing Sheets

(56) References Cited

U.S. PATENT DOCUMENTS

| | | | | |
|---|---|---|---|---|
| 11,223,538 | B1 * | 1/2022 | Arumugam | H04L 45/26 |
| 11,381,461 | B1 * | 7/2022 | Raymond | G06F 11/3006 |
| 2002/0138443 | A1 * | 9/2002 | Schran | G06Q 20/382<br>705/64 |
| 2013/0290525 | A1 * | 10/2013 | Fedor | H04L 41/5009<br>709/224 |
| 2014/0078930 | A1 * | 3/2014 | Bevemyr | H04L 41/0226<br>370/254 |
| 2014/0280900 | A1 * | 9/2014 | Mcdowall | H04L 41/122<br>709/224 |
| 2015/0281004 | A1 * | 10/2015 | Kakadia | H04L 41/5025<br>370/235 |
| 2015/0333953 | A1 * | 11/2015 | Vasseur | H04L 45/22<br>370/228 |
| 2016/0155076 | A1 * | 6/2016 | Fix | G06Q 10/06395<br>705/7.39 |
| 2017/0064591 | A1 * | 3/2017 | Padfield | H04W 36/0088 |
| 2017/0195171 | A1 * | 7/2017 | Wohlert | H04L 67/34 |
| 2017/0353991 | A1 * | 12/2017 | Tapia | G06Q 10/20 |
| 2019/0028347 | A1 * | 1/2019 | Johnston | H04L 43/20 |
| 2019/0036776 | A1 * | 1/2019 | Smith | H04L 41/28 |
| 2019/0205749 | A1 * | 7/2019 | Tan | G06N 3/047 |
| 2019/0280918 | A1 * | 9/2019 | Hermoni | H04L 41/069 |
| 2019/0306023 | A1 * | 10/2019 | Vasseur | G06N 20/20 |
| 2020/0328978 | A1 * | 10/2020 | Gupta | H04L 45/306 |
| 2021/0075689 | A1 | 3/2021 | Ramanathan et al. | |
| 2021/0263749 | A1 | 8/2021 | Laskawiec | |
| 2021/0385135 | A1 * | 12/2021 | Côté | G06F 17/18 |
| 2022/0029906 | A1 * | 1/2022 | Mahesh | H04L 41/40 |
| 2022/0045959 | A1 * | 2/2022 | Chauhan | H04L 43/087 |
| 2022/0094596 | A1 * | 3/2022 | Jagannathan | H04L 63/20 |
| 2022/0240106 | A1 * | 7/2022 | Wang | G06N 3/045 |
| 2022/0407809 | A1 * | 12/2022 | Wu | H04L 47/2441 |

OTHER PUBLICATIONS

"Cisco Network Assurance Engine Getting Started Guide, Release 3.0(1)", online: https://www.cisco.com/c/dam/en/us/td/docs/data-center-analytics/network-assurance-engine/3_0_1/getting_started/Cisco_NAE_Getting_Started_Guide_Release_3_0_1.pdf, Feb. 4, 2019, 75 pages, Cisco Systems, Inc.

* cited by examiner

RECOMMENDING CONFIGURATION CHANGES IN SOFTWARE-DEFINED NETWORKS USING MACHINE LEARNING

TECHNICAL FIELD

The present disclosure relates generally to computer networks, and, more particularly, to recommending configuration changes in software-defined networks using machine learning.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

Unfortunately, SD-WAN deployments are complex networks that are rarely understood in their entirety. While best practices and design validation approaches do exist, there is still the potential for misconfigurations to occur. Indeed, many SD-WAN networks depend on the local dynamics of the Internet and the variety of possible transports (e.g., cable, fiber, satellite, etc.), the applications being used, access patterns, and the like. Consequently, the optimal configuration may vary by site, path, application, and/or time of day. For instance, an automotive factory in China may require very different configuration settings than a bank office in India.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
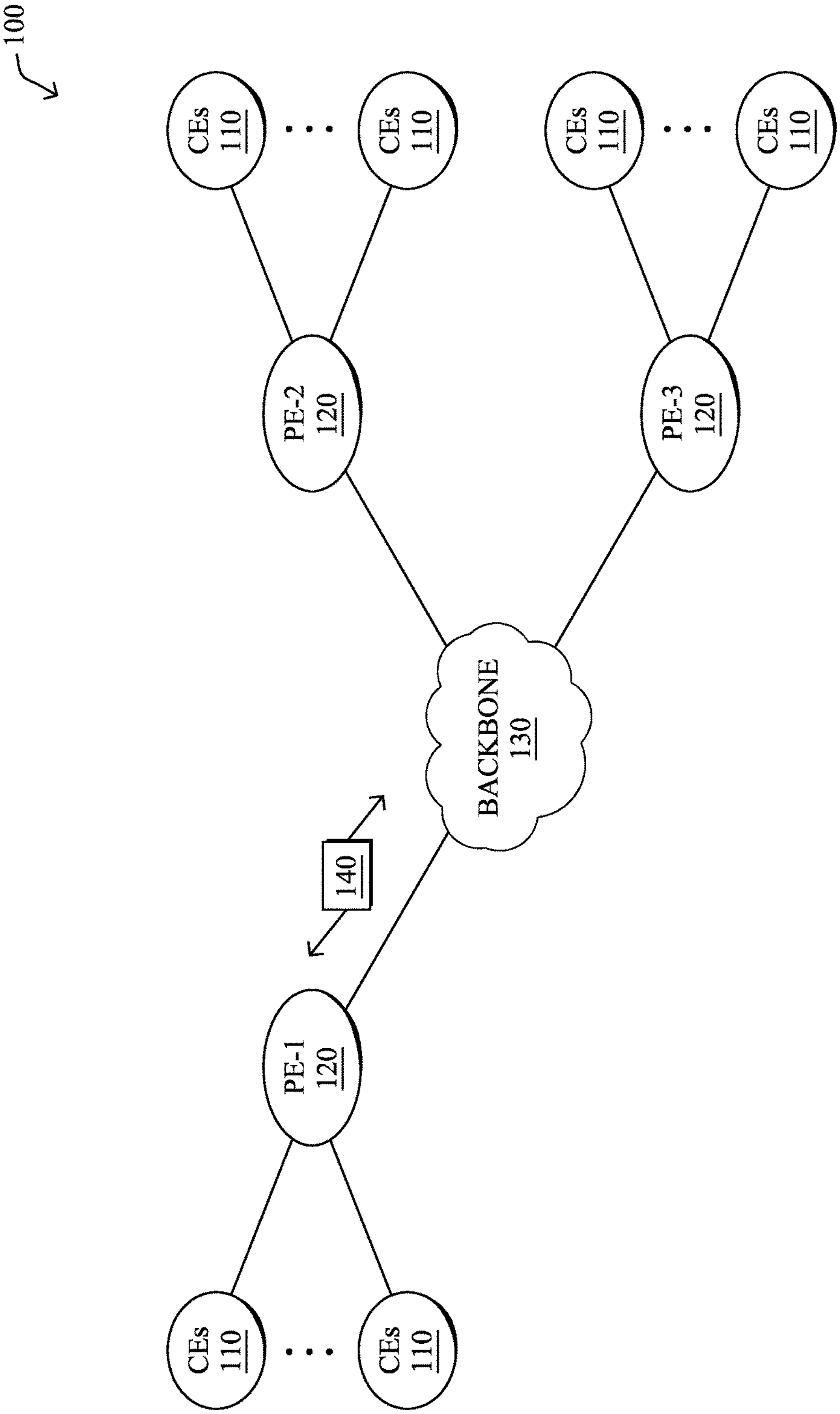
FIGS. 1A-1B illustrate an example communication network.

According to one or more embodiments of the disclosure, a device associates application performance of an online application with network configuration changes implemented across one or more software-defined networks. The device trains a machine learning model to predict an effect of a configuration change on the application performance for any given portion of the one or more software-defined networks. The device generates a recommended configuration change for a particular portion of the one or more software-defined networks, using the machine learning model. The device causes the recommended configuration change to be implemented in the particular portion of the one or more software-defined networks.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective “size” of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or “AMI” applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
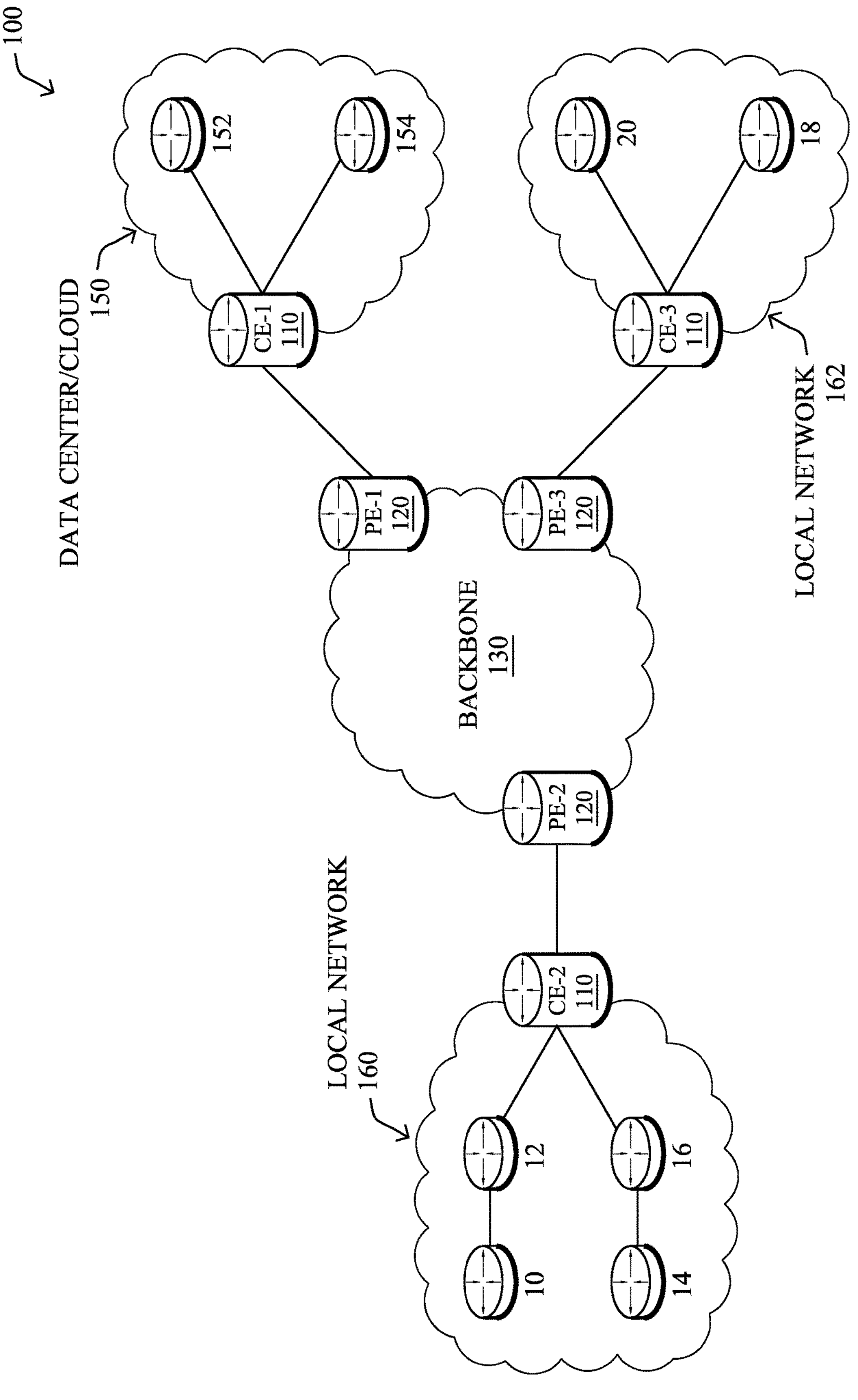

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
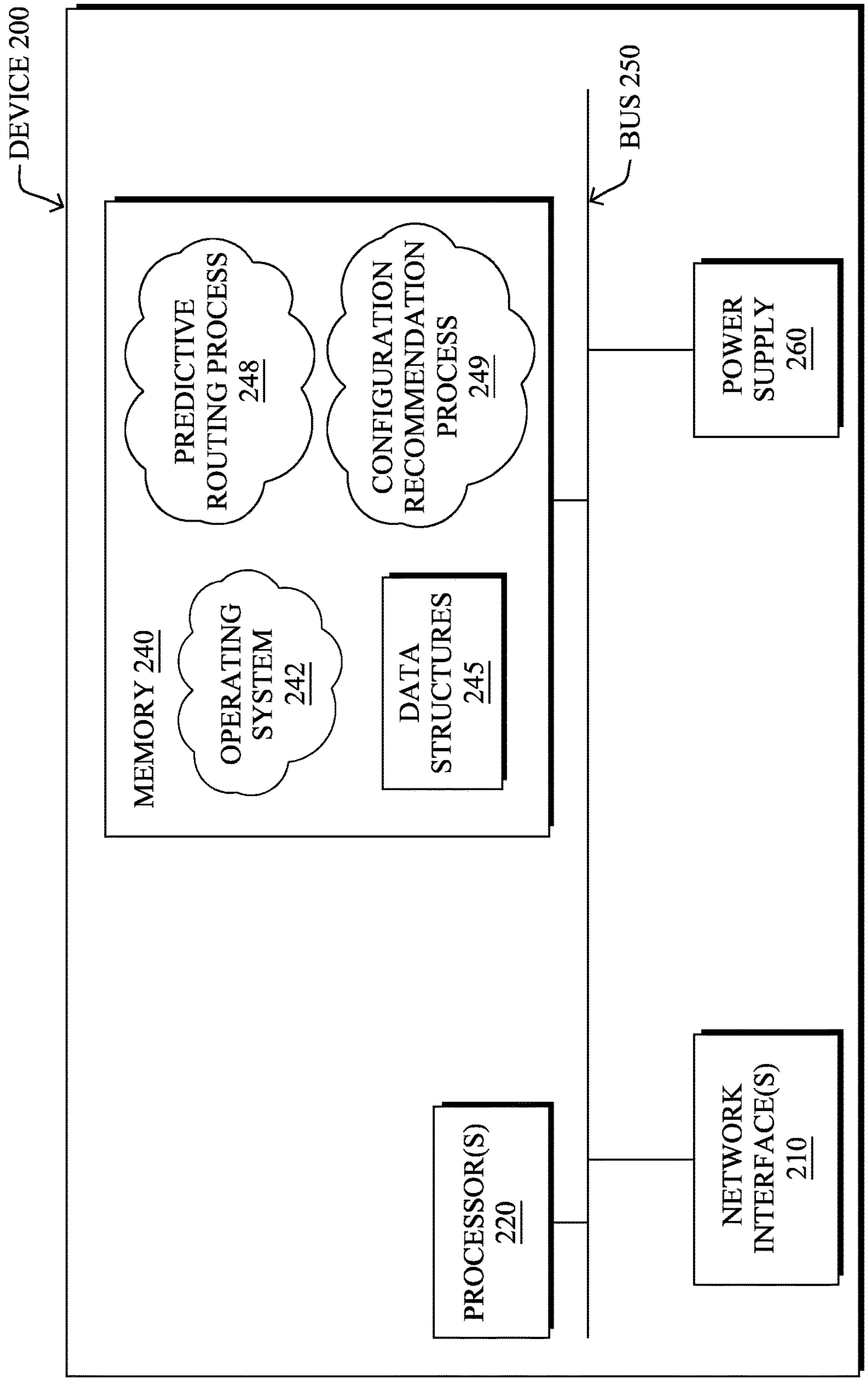
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248 and/or a configuration recommendation process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process 248 and/or configuration recommendation process 249 include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc.

In various embodiments, as detailed further below, predictive routing process 248 and/or configuration recommendation process 249 may include computer executable instructions that, when executed by processor(s) 220, cause device 200 to perform the techniques described herein. To do so, in some embodiments, predictive routing process 248 and/or configuration recommendation process 249 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 and/or configuration recommendation process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that predictive routing process 248 and/or configuration recommendation process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
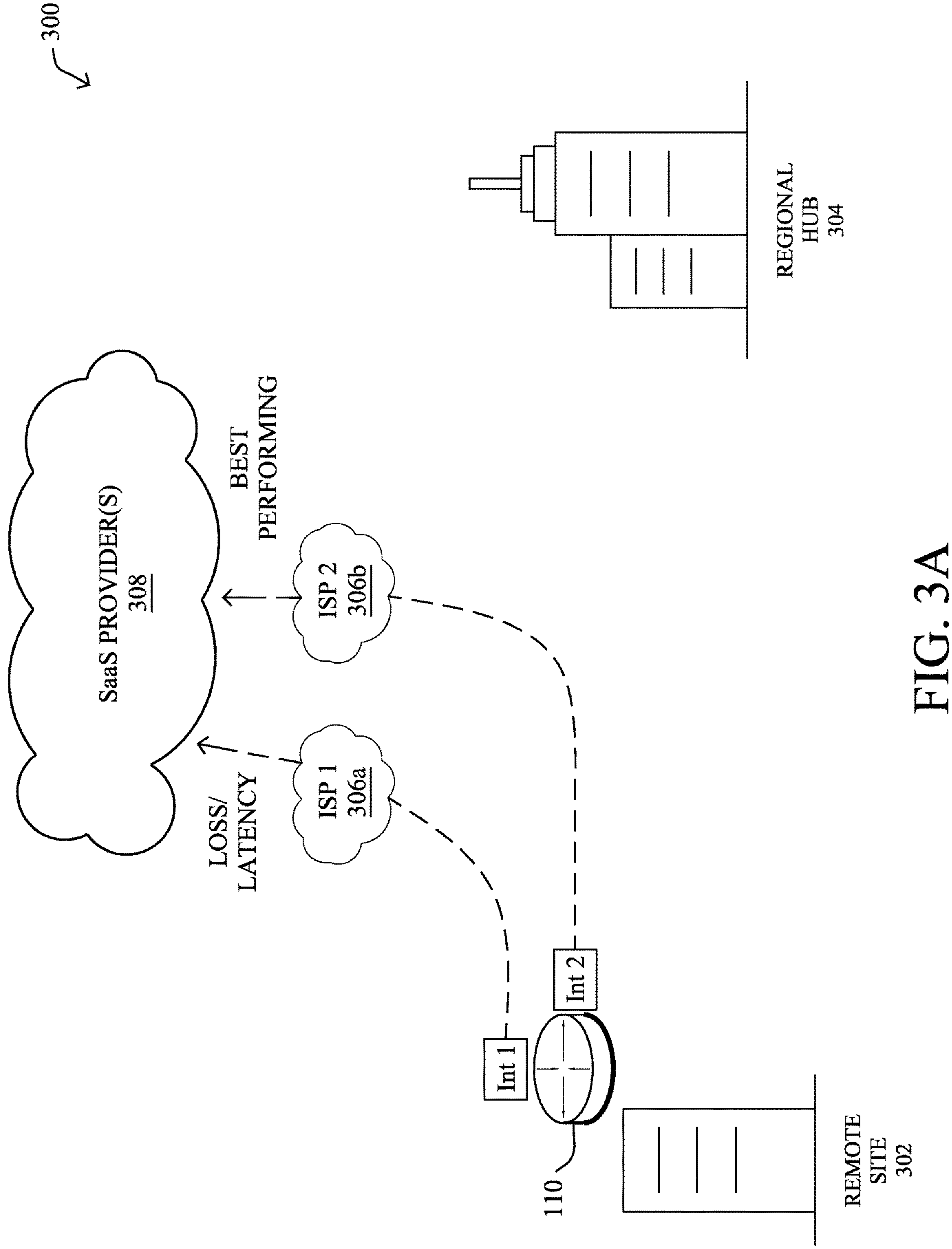
FIGS. 3A-3B illustrate example network deployments.
Figure 3B:
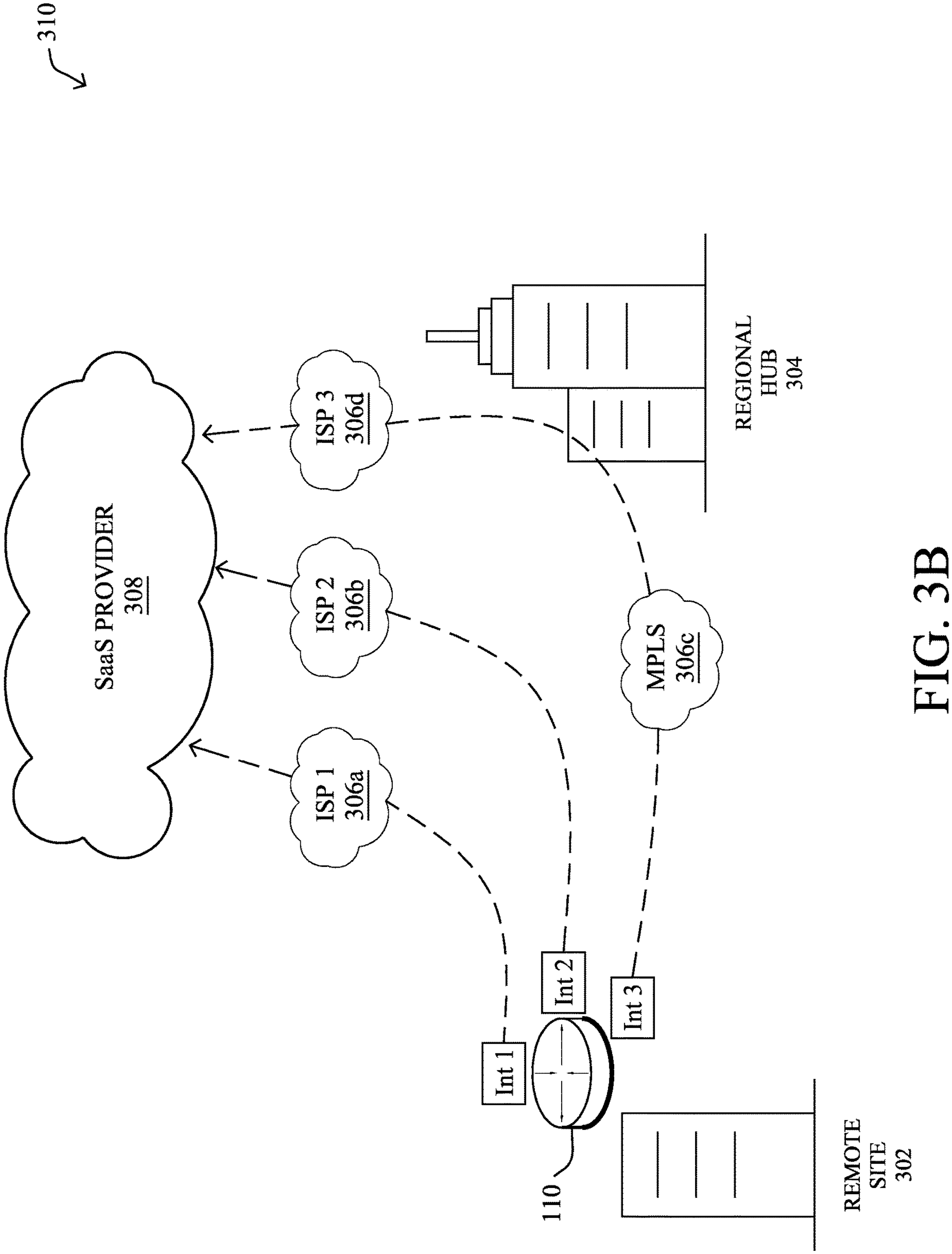

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306*a*, denoted ISP 1 in FIG. 3A. Likewise, a second interface of router 110, Int 2, may establish a backhaul path with SaaS provider(s) 308 via a second ISP 306*b*, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306*b*. In contrast to the example in FIG. 3A, Int 3 of router 110 may establish a third path to SaaS provider(s) 308 via a private corporate network 306*c* (e.g., an MPLS network) to a private data center or regional hub 304 which, in turn, provides connectivity to SaaS provider (s) 308 via another network, such as a third ISP 306*d*.

Regardless of the specific connectivity configuration for the network, a variety of access technologies may be used (e.g., ADSL, 4G, 5G etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
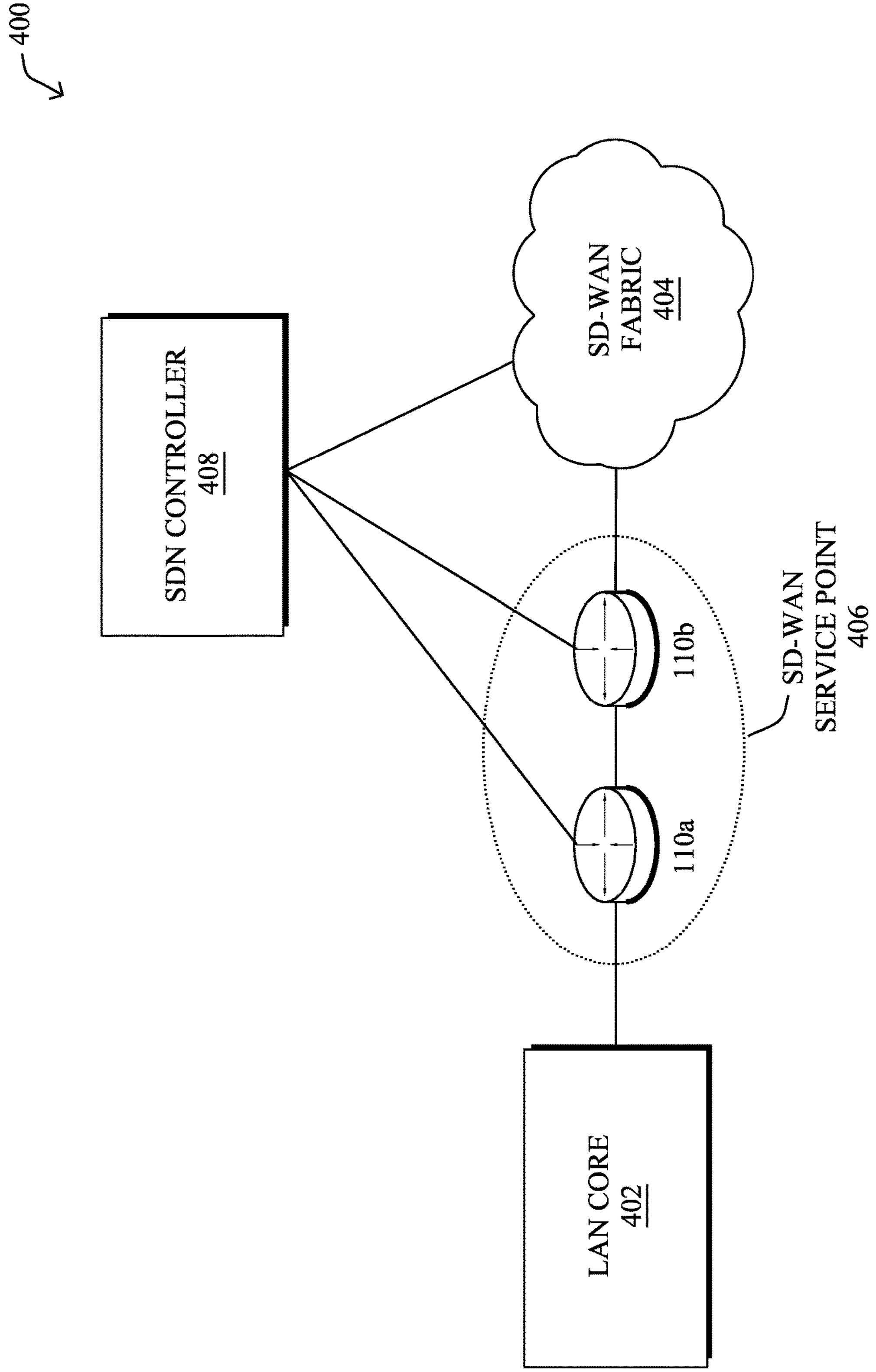
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110*a*-110*b*.

Overseeing the operations of routers 110*a*-110*b* in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

- The SLA for the application is 'guessed,' using static thresholds.
- Routing is still entirely reactive: decisions are made using probes that reflect the status of a path at a given time, in contrast with the notion of an informed decision.
- SLA failures are very common in the Internet and a good proportion of them could be avoided (e.g., using an alternate path), if predicted in advance.

Figure 4B:
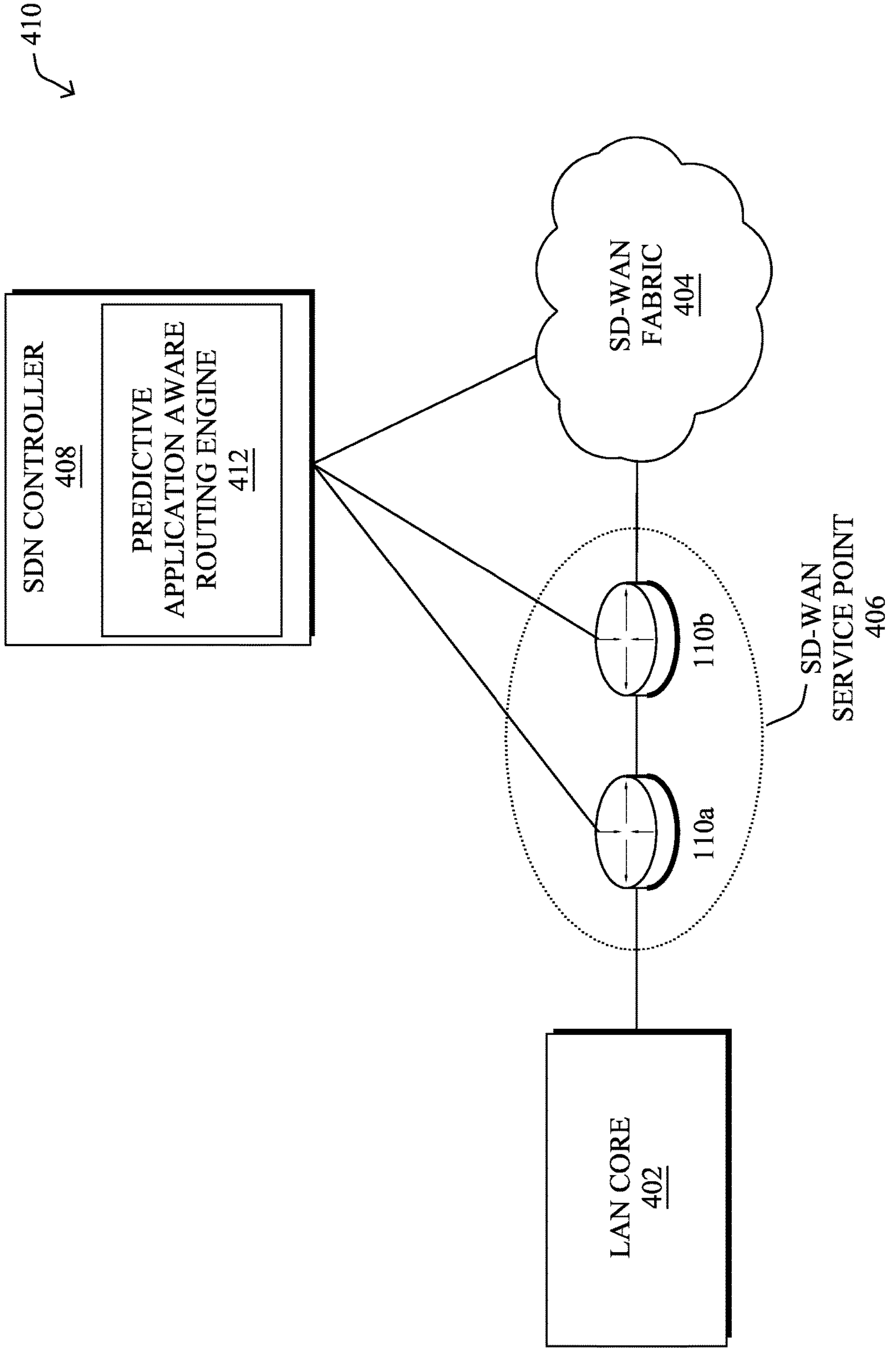

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of predictive routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application (e.g., via an API, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, SD-WAN deployments are complex networks that are rarely understood in their entirety. While best practices and design validation approaches do exist, there is still the potential for misconfigurations to occur. Indeed, many SD-WAN networks depend on the local dynamics of the Internet and the variety of possible transports (e.g., cable, fiber, satellite, etc.), the applications being used, access patterns, and the like. Consequently, the optimal configuration may vary by site, path, application, and/or time of day. For instance, an automotive factory in China may require very different configuration settings than a bank office in India. Unfortunately, current best practices and validation approaches do not offer the level of precision needed to optimize the configuration settings for each of these locations.

Recommending Configuration Changes in SD-WAN Networks Using Machine Learning

The techniques introduced herein leverage machine learning to recommend configuration changes in a network, such as an SD-WAN, based on their likelihood to improve the performance of the network, especially from the perspective of an online application. In some aspects, the techniques herein directly model configuration changes, regardless of their nature, and predict their impact on the application.

Illustratively, the techniques described herein may be performed by hardware, software, and/or firmware, such as in accordance with configuration recommendation process 249, which may include computer executable instructions executed by the processor 220 (or independent processor of interfaces 210) to perform functions relating to the techniques described herein, such as in conjunction with the operation of predictive routing process 248.

Specifically, according to various embodiments, a device associates application performance of an online application with network configuration changes implemented across one or more software-defined networks. The device trains a machine learning model to predict an effect of a configuration change on the application performance for any given portion of the one or more software-defined networks. The device generates a recommended configuration change for a particular portion of the one or more software-defined networks, using the machine learning model. The device causes the recommended configuration change to be implemented in the particular portion of the one or more software-defined networks.

Figure 5:
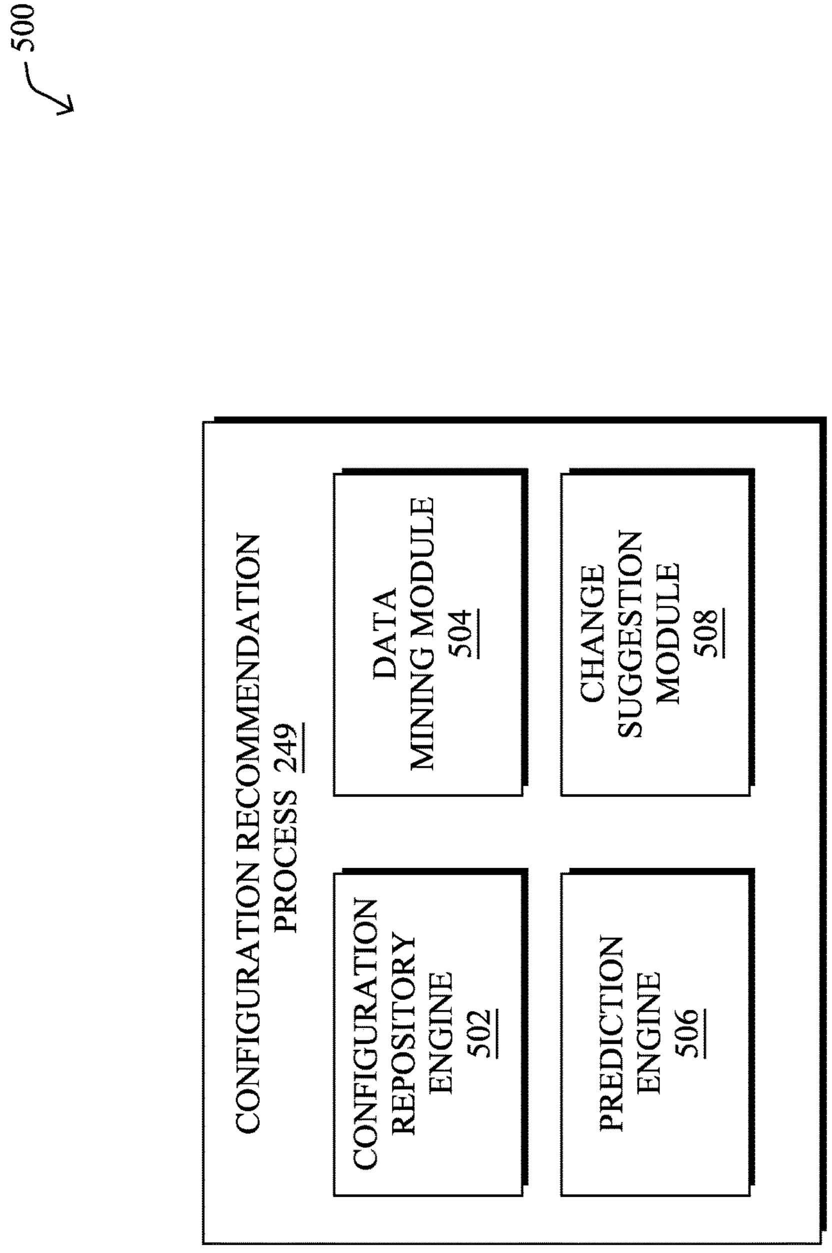
FIG. 5 illustrates an example architecture for recommending configuration changes in a network.

Operationally, FIG. 5 illustrates an example architecture 500 for recommending configuration changes in a network, according to various embodiments. At the core of architecture 500 is configuration recommendation process 249, which may be executed by a controller for a network or another device in communication therewith. For instance, configuration recommendation process 249 may be executed by a controller for a network (e.g., SDN controller 408 in FIGS. 4A-4B), a particular networking device in the network (e.g., a router, etc.), another device or service in communication therewith, or the like. In some embodiments, for instance, configuration recommendation process 249 may be used to implement a predictive application aware routing engine, such as predictive application aware routing engine 412, or another supervisory service for the network.

As shown, configuration recommendation process 249 may include any or all of the following components: a configuration repository engine 502, a data mining module 504, a prediction engine 506, and/or a change suggestion module 508. As would be appreciated, the functionalities of these components may be combined or omitted, as desired. In addition, these components may be implemented on a singular device or in a distributed manner, in which case the combination of executing devices can be viewed as their own singular device for purposes of executing configuration recommendation process 249.

In various embodiments, configuration repository engine 502 may be configured to obtain and store configuration information, routing policies, path metrics (e.g., measured delay, jitter, packet loss, etc.), and/or available QoE information associated with a particular online/SaaS application (e.g., based on user-provided ratings of their satisfaction with that application). Associated with the obtained information may also be metadata indicative of the network from which the information was obtained, timestamp information indicative of when the information was collected, location data indicative of where the information was collected (e.g., in a specific city or metro area, state, country, etc.), service provider information, or the like.

In some embodiments, configuration repository engine 502 may collect and store information across different networks operated by different entities, such as businesses, schools, governments, or other organizations. Indeed, the use of a large number of examples, potentially across different SDNs/SD-WANs, can help to improve the recommendations by configuration recommendation process 249.

In some embodiments, configuration repository engine 502 may store its collected information in the form of graphs and/or sub-graphs. As would be appreciated, the network configurations (e.g., routing policies, etc.) defined by administrators of an SD-WAN network determine the paths from and to the endpoints of the network, as well as to third-party services (e.g., SASE endpoints). From a formal point of view, the paths incident to one device, or a few devices, can be pictured as a subgraph of the whole network, and the variables of interest—such as disruptions, outages, frequency of disturbance, lags, packet-loss, jitter, etc.—can be observed for each sub-graph. The settings in the configuration can be modified by the owners of the network, thus modifying the sub-graphs determined by the configuration, and effectively creating a new one.

Figure 6:
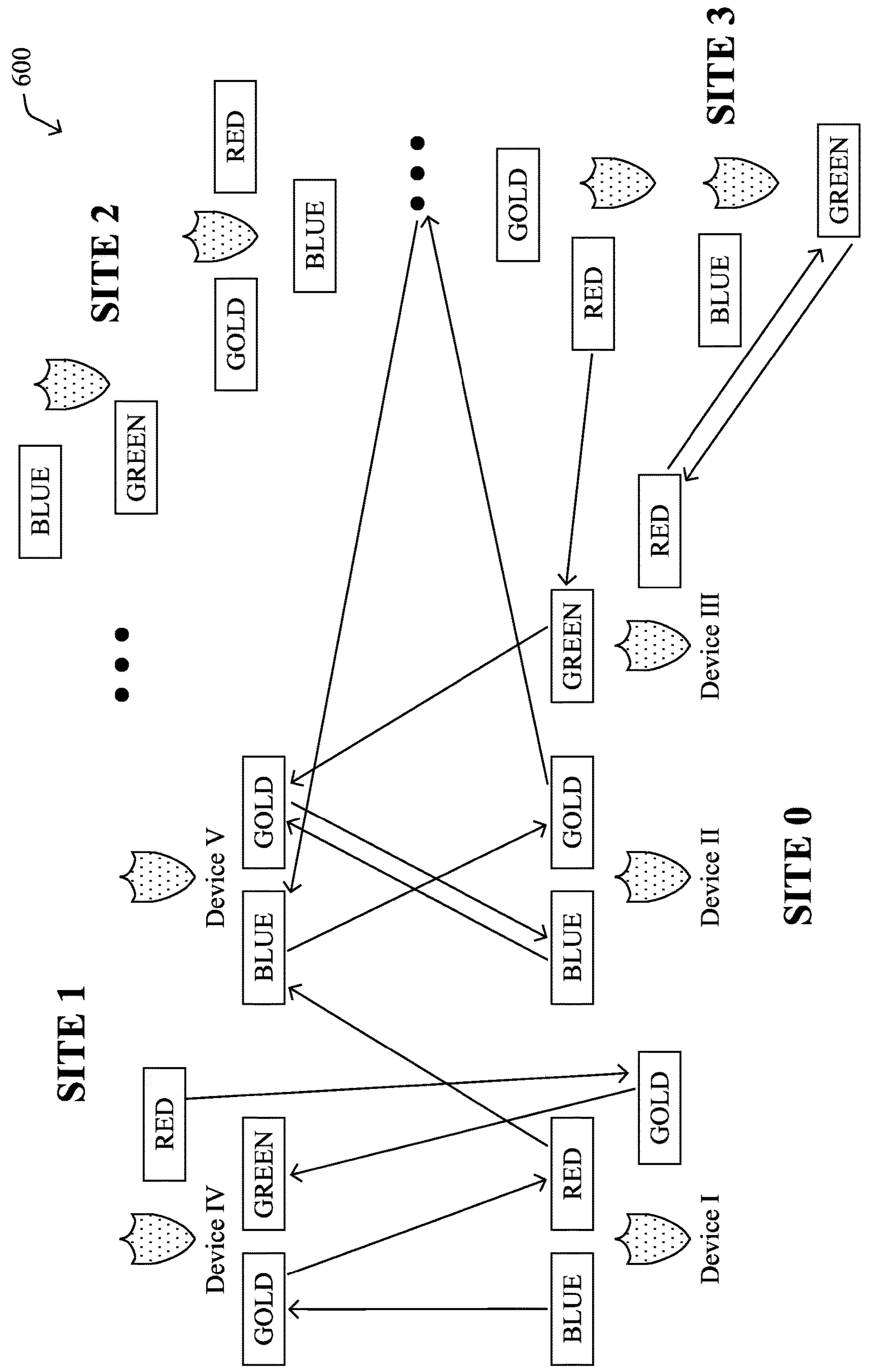
FIG. 6 illustrates an example representation of different portions of a network.

FIG. 6 illustrates an example representation 600 of different portions of a network, in some embodiments. As shown, assume that different devices are located at different sites in a network. From representation 600, different sub-graphs can be extracted. For instance, assume that each device in representation 600 can be 'colored' with different colors. In such a case, one sub-graph may be composed of all the colors of Device I, all their immediate neighbors and the paths extent between them, or all the colors of site 0, their neighbors and the paths linking them. Alternatively, another sub-graph may be formed by considering the colors of devices belonging to different sites, say Device I and Device V, as vertices in a sub-graph and the paths between them as the edges.

Each of those sub-graphs, which can be extracted from the whole network in example representation 600, can be associated with the observed performances of the application(s) relying on the elements of that sub-graph (e.g., SLA violations, user ratings, etc.). Hence, they represent potential sources of low performance if the configuration and policy settings that give rise to them are ill-chosen. Conversely, the performance of applications and the resulting user experience can be improved by replacing some of them with similar, but better-performing, versions.

Referring again to FIG. 5, configuration repository engine 502 may act as a repository for the following, which may be represented in graph form:

- Descriptors of the (local) network conditions, potentially including the geographic location, device type, software version, usage patterns (in the form of statistics about application usage over time). These descriptors can be converted to feature vectors for learning purposes.
- Application performance scores, whose role is to measure how well the network and its components perform for each application or class of applications. The scores are typically computed from metrics measured on the network devices for each application, separately, but they may also qualify a path across endpoints or even a collection of paths/devices at a more aggregated level.

Given a dataset made of pairs of similar sub-graphs, with their associated performances, statistical models (in a broader sense, machine learning models) can be trained to predict the effect of differences in the sub-graphs on the performances. In some embodiments, the mining and learning aspects of the techniques herein consist in leveraging the availability of a very large amount of such data to identify sub-graphs significantly associated with good or bad performances. The recommendation functions use those associations to discover the best replacements for those pieces of configurations that translate into low-performing sub-graphs.

In some embodiments, data mining module 504 may evaluate the information from configuration repository engine 502, to assess the network(s) and their sub-components at a very large scale to extract relevant differences among them, along with the corresponding changes in application performance. These data can later be used to train machine learning models that predict the effect of making a given change in the configuration of a region of a network.

Prediction engine 506 may be responsible for training a machine learning model to predict the effect of a given configuration change, in various embodiments. This can be done by building a machine learning algorithm that, given a change in configuration and network policies and a set of network conditions and properties, predicts the increase or decrease in application performance(s) that would result. Such a model may be trained using the data mined by data mining module 504 (e.g., differences in configuration and the corresponding changes in application performance).

In some instances, one approach may be for data mining module 504 to mine the information from configuration repository engine 502 and, in turn, have prediction engine 506 train a model using structured learning. For instance, prediction engine 506 may leverage sub-graph mining (e.g., Frequent Subgraph Mining), Graph Learning, Graph Deep Learning, or related methods (e.g., Graph Embedding, Graph Neural Networks, etc.). To train such an algorithm, prediction engine 506 may parse the network structures of many networks, to identify the recurring similarities or differences among their components that correlate with significantly degraded or improved application performance.

More specifically, prediction engine 506 may use the set of features from its graph analysis in predictive and/or regressive models. By applying those techniques to the subgraphs created by some policies, prediction engine 506 can train a model to predict the values of the performance variables for a graph. Supervised models trained on many sub-graphs, together with additional features (e.g., locations, etc.) and their past performance values, as targets, can predict the effect of a potential change in the configuration. Prediction engine 506 can then generate a recommended configuration change as the most desirable/optimal modification from this prediction.

Figure 7:
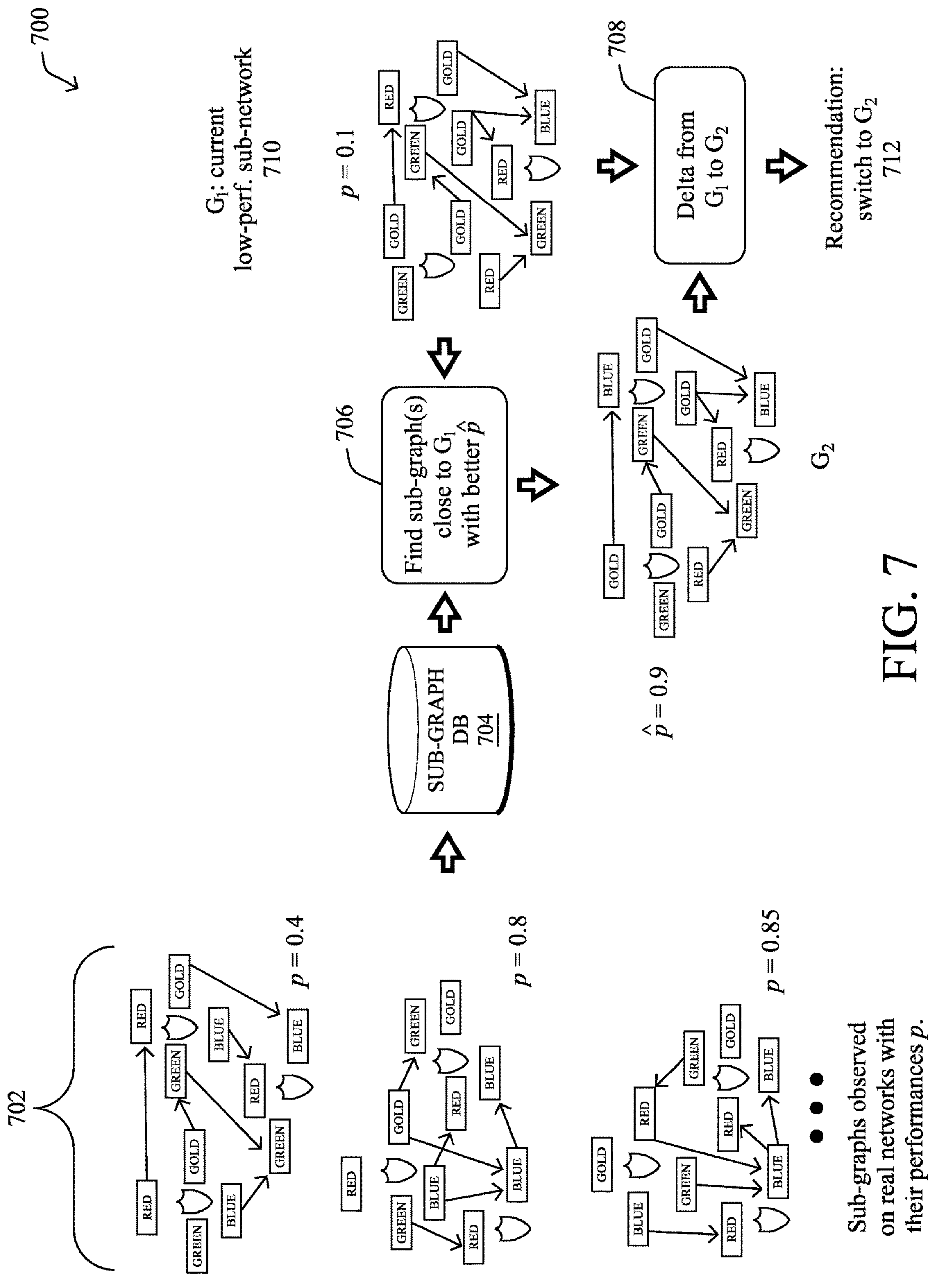
FIG. 7 illustrates an example of the identification of a recommended configuration change.

FIG. 7 illustrates an example 700 of the identification of a recommended configuration change, according to various embodiments. As shown, assume that there are a plurality of sub-graphs 702, each of which has an associated application performance value p, stored within a sub-graph database (db) 704, such as by configuration repository engine 502, described previously.

Data mining module 504 may perform data mining 706 on database 704, to mine configuration differences. The mining process is mostly concerned about those differences that lead to improved application performance, but it may, in principle, also be used to generate negative examples as well, which are important to train accurate predictive models.

The result of this mining process can be used directly to perform recommendations, or it can be used as a dataset to train a machine learning model that predicts the outcome of a configuration change. For instance, given a particular sub-graph 710, the delta 708 with another sub-graph offering better performance can be used to generate a recommendation 712.

Referring again to FIG. 5, configuration recommendation process 249 may also include change suggestion module 508 that uses the prediction model(s) trained by prediction engine 506 and the outputs of data mining module 504, to recommend configuration changes for a particular portion of the network(s), based on the anticipated performance gain for the performance of the application. Such recommendations may be provided to a user interface for review by an administrator or implemented, automatically, in various embodiments. For instance, change suggestion module 508 may generate a list of differences in some structured format (akin to the output of code versioning tools such as Git or the Gnu diff command) that can be readily applied by the administrator, or even by an automated mechanism.

Multiple approaches can be used to support the recommendations by change suggestion module 508. In a first embodiment, which does not even necessitate using machine learning, nearest-neighbor reasoning could be used. Indeed, if the system observes that some portion of the network (e.g., a subset/sub-graph of endpoints, interfaces, and paths) yields poor application performance, prediction engine 506 can look for the nearest, most similar, subsets of network(s) with better predicted performance and identify the differences that explain the improvement. Change suggestion module 508 can then recommend these differences to an administrator those configurations (e.g., policy changes) that will translate into those differences.

In another embodiment, prediction engine 506 may use a more efficient modelling approach (e.g., neural networks, trees, SVMs, etc.) and use the differences in the subsets of networks observed across entities as features, as well as the application experience as a target, to learn and predict the effect of configuration changes.

When such models are available, prediction engine 506 can also explore the space of possible configurations to find useful improvements using the trained models as guides. The exploration could be carried with random search or more elaborate search procedures (e.g., gradient descent, Particle Swarm Optimization, or Reinforcement Learning based on models trained according to the previous description). Such search methods are typically challenging in extremely high dimensionality such as the one yielded by all possible configurations, but they can be refined by restricting the search to common differences found in the data-lake of configurations.

In various embodiments, prediction engine 506 could also leverage a generative approach that seeks to generate a configuration difference that will optimize the application experience, similarly to what is done using Generative Adversarial Networks (GANs). Here, the model may consist of two jointly-trained models:

1. A generative network that yields candidate configuration changes, that is differences in a part of the network structure that translate into actionable changes in the configuration and policies set by the administrators.
2. An evaluation network that evaluates the changes for their capacity to improve the application experience.

The generative network, trained on the bank of subgraphs observed in the past, takes as input the configuration to optimize and the local network conditions (expressed as a feature vector) and produces a list of actionable configuration and policy changes. Similar to a generator in a GAN, it includes a random input as well that acts as an explorative component. The evaluation network predicts the impact(s) on the application experience of each configuration change to identify the best one(s).

In this instance, the evaluation network would essentially be bootstrapped with a model trained by prediction engine 506, and then fine-tuned to evaluate any configuration changes generated by the generative network. Conversely, the loss function of the generative network would be biased towards yielding changes that should be beneficial to the application experience.

Such an implementation would also act as a reinforcement learning system, as the generative network acts as an explorative component due to its random input that performs a biased search in the design space yet is biased towards predictably beneficial changes by the evaluation network (exploitative component). The strength of this strategy is that one can directly integrate the actual outcome of a change into the training set of the evaluation network with a significantly larger weight than indirect observations across customers, wherein hidden conditions might cause an unexplained variance in the target.

Figure 8:
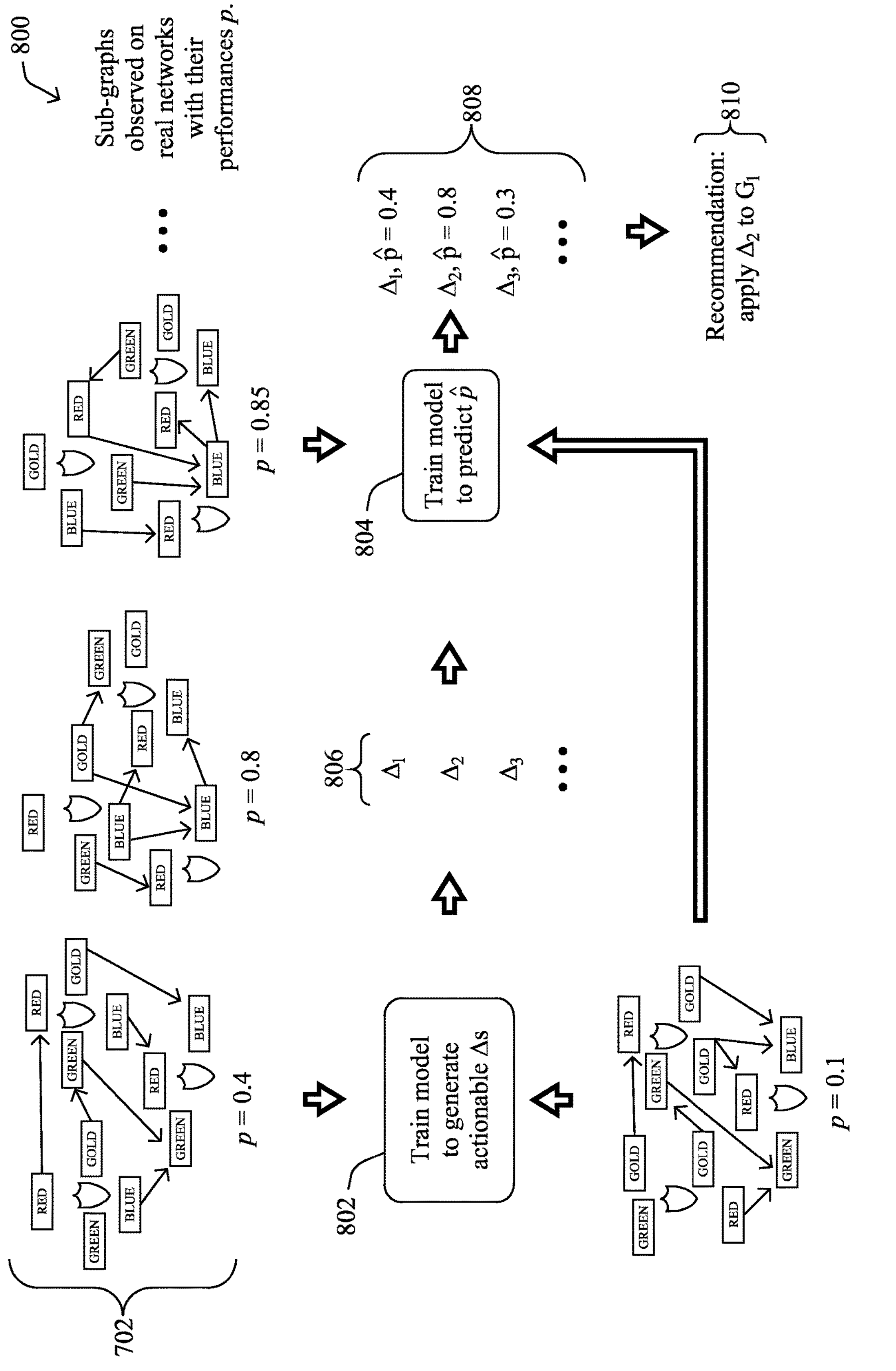
FIG. 8 illustrates an example of using adversarial models to recommend a configuration change.

FIG. 8 illustrates an example 800 of using adversarial models to recommend a configuration change, according to various embodiments. As shown, again assume that there is a plurality of sub-graphs 702, each of which has an associated performance metric for the online application(s). In such a case, a first model 802 could be trained to generate actionable configuration changes 806. In addition, a second model 804 could also be trained to learn to predict the outcomes 808 of applying such changes 806 (higher performances p are assumed to be better). A recommendation 810 can then be selected from amongst the outcomes 808, such as by selecting the change 806 that would result in the highest gain in application performance. As these changes are applied, both models 802-804 are adjusted in their ability to produce meaningful suggestions, i.e., the generator model 802 is biased towards producing configuration changes 806 that improve the performance, whereas the evaluation model 804 is biased towards accurately predicting the outcomes 808 of those configuration changes.

Figure 9:
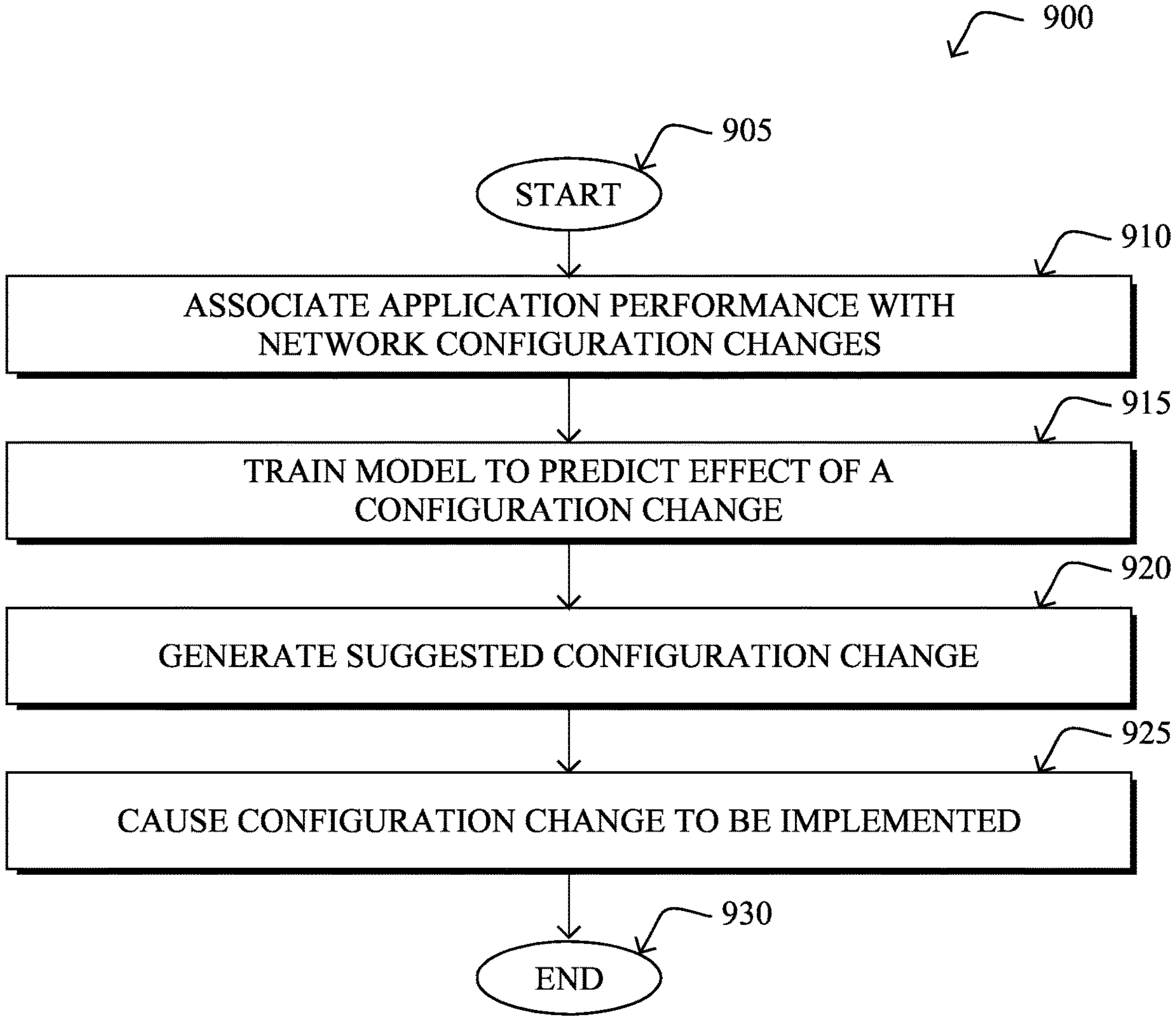
FIG. 9 illustrates an example simplified procedure for recommending a configuration change for a portion of a network.

FIG. 9 illustrates an example simplified procedure 900 (e.g., a method) for recommending a configuration change for a portion of a network, in accordance with one or more embodiments described herein. For example, a non-generic, specifically configured device (e.g., device 200), such as controller for a network (e.g., an SDN controller, an edge router, or other device in communication therewith) or other supervisory device, may perform procedure 900 by executing stored instructions (e.g., configuration recommendation process 249). The procedure 900 may start at step 905, and continues to step 910, where, as described in greater detail above, the device may associate application performance of an online application with network configuration changes implemented across one or more software-defined networks. In some embodiments, the application performance of the online application is quantified based on service level agreement violations by network paths that are used to convey traffic associated with the online application. In other embodiments, the application performance of the online application is quantified based on feedback provided by users of the online application. In further embodiments, the one or more software-defined networks include at least two networks operated by different entities (e.g., companies, schools, organizations, etc.). In yet another embodiment, the one or more software-defined networks include at least one SD-WAN.

At step 915, as detailed above, the device may train a machine learning model to predict an effect of a configuration change on the application performance for any given portion of the one or more software-defined networks. In some embodiments, the machine learning model identifies the particular portion of the one or more software-defined networks, based on a similarity between the particular portion of the one or more software-defined networks and at least one other portion of the one or more software-defined networks at which the recommended configuration change was implemented. Such a similarity may be based one or more of: a geographic location, a device type, a software version, or a traffic pattern for the online application, in some embodiments. In further embodiments, the machine learning model comprises a first model trained to generate possible configuration changes and a jointly-trained second model to predict effects of those changes.

At step 920, the device may generate a recommended configuration change for a particular portion of the one or more software-defined networks, using the machine learning model, as described in greater detail above. For instance, the device may recommend a configuration change such as changing a software version of one or more devices, adjusting a threshold, changing a parameter, or the like.

At step 925, as detailed above, the device may cause the recommended configuration change to be implemented in the particular portion of the one or more software-defined networks. In one embodiment, the device may do so by providing the recommended configuration change for display. Doing so allows a network administrator to then approve or deny the change. In other embodiments, the configuration change may be implemented, automatically, without intervention by an administrator. Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for recommending configuration changes in SDNs/SD-WANs, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:

associating, by a device, application performance of an online application with network configuration changes implemented across one or more software-defined networks;

storing, by the device, a plurality of subgraphs, wherein the plurality of subgraphs are extracted from the one or more software-defined networks to comprise network devices and paths linking the network devices of respective different portions of the one or more software-defined networks;

jointly training using the plurality of subgraphs, by the device and based on differences in configuration of different portions of the one or more software-defined networks, a first model comprising a generative network that generates possible configuration changes that includes routing or policy changes and a second model comprising an evaluation network that predicts effects of the possible configuration changes on the application performance for any given portion of the one or more software-defined networks;

identifying, by the device and by using the first model, a first subgraph of the plurality of subgraphs that is similar to a second subgraph of the plurality of subgraphs, wherein determining that the first subgraph is similar to the second subgraph is based on one or more of: a geographic location, a device type, a software version, or a traffic pattern for the online application;

determining, based on comparing the first subgraph to the second subgraph, difference data;

generating, based on the difference data between the first subgraph and the second subgraph and by the device and by using the first model and the second model, a recommended configuration change for a particular portion of the one or more software-defined networks, wherein the recommended configuration change is generated by the first model and comprises a change to a routing policy, further wherein the recommended configuration change is predicted by the second model to improve performance of the particular portion of the one or more software-defined networks; and causing, by the device, the recommended configuration change to be implemented in the particular portion of the one or more software-defined networks.

2. The method as in claim 1, wherein the application performance of the online application is quantified based on service level agreement violations by network paths that are used to convey traffic associated with the online application.

3. The method as in claim 1, wherein the application performance of the online application is quantified based on feedback provided by users of the online application.

4. The method as in claim 1, wherein the one or more software-defined networks comprise at least two networks operated by different entities.

5. The method as in claim 1, wherein causing the recommended configuration change to be implemented in the particular portion of the one or more software-defined networks comprises:

providing, by the device, the recommended configuration change for display.

6. The method as in claim 1, wherein the one or more software-defined networks comprise at least one software-defined wide area network (SD-WAN).

7. The method as in claim 1, wherein the online application is a software-as-a-service (SaaS) application.

8. An apparatus, comprising:

one or more network interfaces;

a processor coupled to the one or more network interfaces and configured to execute one or more processes; and a memory configured to store a process that is executable by the processor, the process when executed configured to:

associate an application performance of an online application with network configuration changes implemented across one or more software-defined networks;

storing, by a device, a plurality of subgraphs, wherein the plurality of subgraphs are extracted from the one or more software-defined networks to comprise network devices and paths linking the network devices of respective different portions of the one or more software-defined networks;

jointly train using the plurality of subgraphs, based on differences in configuration of different portions of the one or more software-defined networks, a first model comprising a generative network that generates possible configuration changes that includes routing or policy changes and a second model comprising an evaluation network that predicts effects of the possible configuration changes on the application performance for any given portion of the one or more software-defined networks;

identify, by using the first model, a first subgraph of plurality of subgraphs that is similar to a second subgraph of the plurality of subgraphs, wherein determining that the first subgraph is similar to the second subgraph is based on one or more of: a geographic location, a device type, a software version, or a traffic pattern for the online application;

determine, based on comparing the first subgraph to the second subgraph, difference data;

generate, based on the difference data between the first subgraph and the second subgraph and by using the first model and the second model, a recommended configuration change for a particular portion of the one or more software-defined networks, wherein the recommended configuration change is generated by the first model and comprises a change to a routing policy, further wherein the recommended configuration change is predicted by the second model to improve performance of the particular portion of the one or more software-defined networks; and cause the recommended configuration change to be implemented in the particular portion of the one or more software-defined networks.

9. The apparatus as in claim 8, wherein the application performance of the online application is quantified based on service level agreement violations by network paths that are used to convey traffic associated with the online application.

10. The apparatus as in claim 8, wherein the application performance of the online application is quantified based on feedback provided by users of the online application.

11. The apparatus as in claim 8, wherein the one or more software-defined networks comprise at least two networks operated by different entities.

12. The apparatus as in claim 8, wherein the apparatus causes the recommended configuration change to be implemented in the particular portion of the one or more software-defined networks by:

providing the recommended configuration change for display.

13. The apparatus as in claim 8, wherein the one or more software-defined networks comprise at least one software-defined wide area network (SD-WAN).

14. A tangible, non-transitory, computer-readable medium storing program instructions that cause a device to execute a process comprising:

associating, by the device, application performance of an online application with network configuration changes implemented across one or more software-defined networks;

storing, by the device, a plurality of subgraphs, wherein the plurality of subgraphs are extracted from the one or more software-defined networks to comprise network devices and paths linking the network devices of respective different portions of the one or more software-defined networks;

jointly training using the plurality of subgraphs, by the device and based on differences in configuration of different portions of the one or more software-defined networks, a first model comprising a generative network that generates possible configuration changes that includes routing or policy changes and a second model comprising an evaluation network that predicts effects of the possible configuration changes on the application performance for any given portion of the one or more software-defined networks;

identifying, by the device and by using the first model, a first subgraph of the plurality of subgraphs that is similar to a second subgraph of the plurality of subgraphs, wherein determining that the first subgraph is similar to the second subgraph is based on one or more of: a geographic location, a device type, a software version, or a traffic pattern for the online application;

determining, based on comparing the first subgraph to the second subgraph, difference data;

generating, based on the difference data between the first subgraph and the second subgraph and by the device and by using the first model and the second model, a recommended configuration change for a particular portion of the one or more software-defined networks, wherein the recommended configuration change is generated by the first model and comprises a change to a routing policy, further wherein the recommended configuration change is predicted by the second model to improve performance of the particular portion of the one or more software-defined networks; and causing, by the device, the recommended configuration change to be implemented in the particular portion of the one or more software-defined networks.

15. The tangible, non-transitory, computer-readable medium of claim 14, wherein the application performance of the online application is quantified based on service level agreement violations by network paths that are used to convey traffic associated with the online application.

16. The tangible, non-transitory, computer-readable medium of claim 14, wherein the application performance of the online application is quantified based on feedback provided by users of the online application.

17. The tangible, non-transitory, computer-readable medium of claim 14, wherein the one or more software-defined networks comprise at least two networks operated by different entities.

18. The tangible, non-transitory, computer-readable medium of claim 14, wherein causing the recommended configuration change to be implemented in the particular portion of the one or more software-defined networks comprises:

providing, by the device, the recommended configuration change for display.

19. The tangible, non-transitory, computer-readable medium of claim 14, wherein the one or more software-defined networks comprise at least one software-defined wide area network (SD-WAN).

20. The tangible, non-transitory, computer-readable medium of claim 14, wherein the online application is a software-as-a-service (SaaS) application.

* * * * *